UNITED STATES PATENT OFFICE.

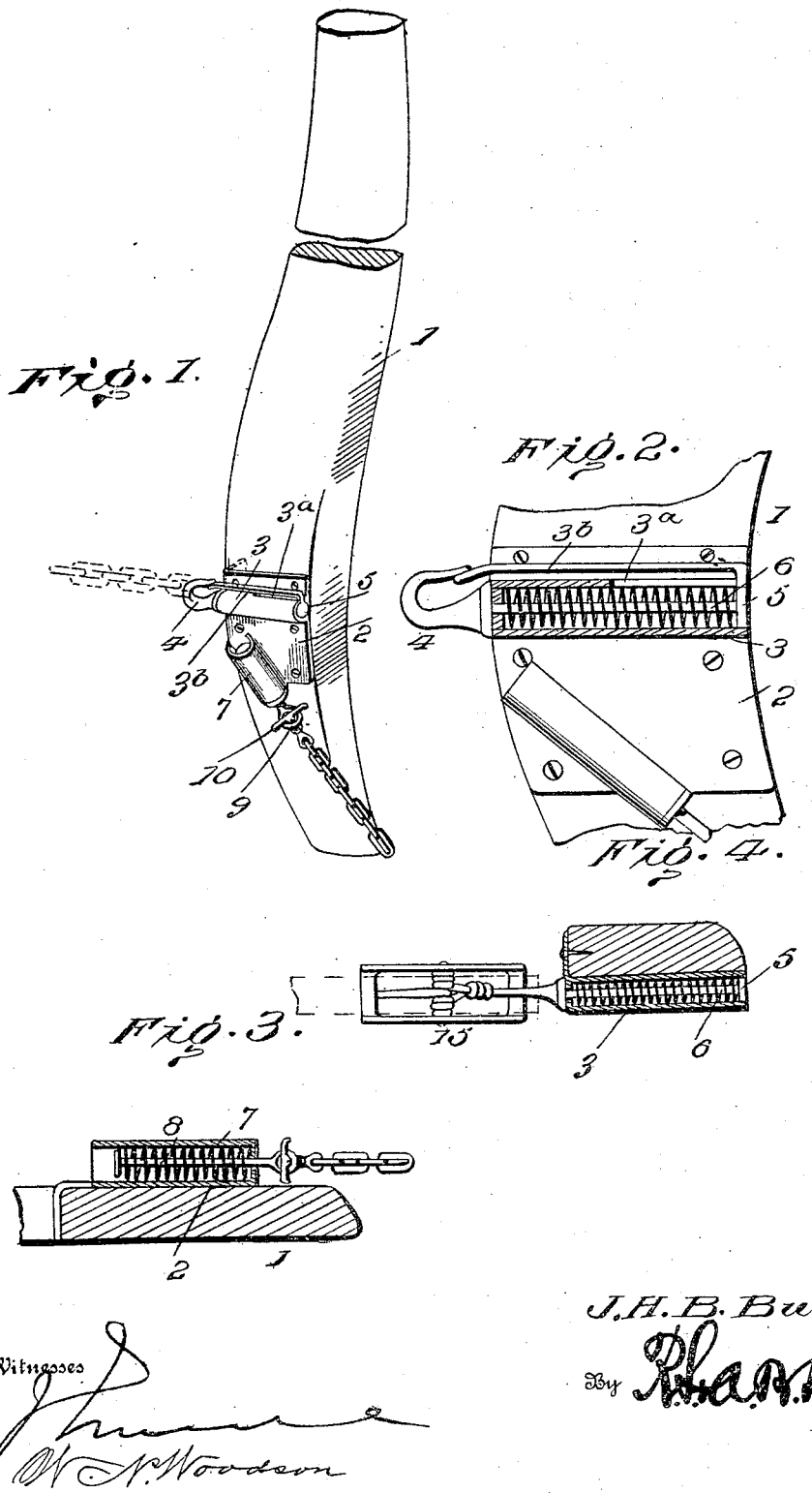

JOHN H. B. BUTTS, OF PICKARD, GEORGIA.

HAME.

No. 868,528.   Specification of Letters Patent.   Patented Oct. 15, 1907.

Application filed August 27, 1906. Serial No. 332,227.

*To all whom it may concern:*

Be it known that I, JOHN H. B. BUTTS, a citizen of the United States, residing at Pickard, in the county of Upson and State of Georgia, have invented certain new and useful Improvements in Hames, of which the following is a specification.

The object of this invention is to provide a novel form of hame designed particularly to admit of peculiar connection of the traces or trace chains with the horse collar so as to prevent sudden strain upon the draft animal or animals as the load is pulled by such animal or animals.

Specifically speaking, the invention embodies peculiar means establishing an elastic or spring connection between the hames and the portions of the harness connecting said hames to the vehicle or load.

For a full description of the invention and the merits thereof and also to acquire a knowledge of the details of construction of the means for effecting the result, reference is to be had to the following description and accompanying drawings, in which:

Figure 1 is a perspective view showing a hame comprising the invention. Fig. 2 is a sectional view bringing out more clearly the construction of the essential parts of the device and taken on a line through the horizontal housing. Fig. 3 is a view similar to Fig. 2 taken on a line through the lower housing. Fig. 4 is a view showing a modification wherein a trace buckle is substituted for the trace hook illustrated in the other figures.

Corresponding and like parts are referred to in the following description and indicated in all the views of the drawings by the same reference characters.

Specifically describing the invention, the numeral 1 designates the hame which in general form is substantially the same in structure as those most commonly in use. To increase the substantiality thereof same may be made of metal or otherwise as desired. At the lower portion of the hame 1 is attached a plate 2, the latter being secured thereto by substantial fastening means of any suitable form. The plate 2 is formed with a horizontal or transverse housing 3 in which is mounted the shank of a trace or trace chain hook 4, the shank of said hook being formed at its front end with a head 5 against which a coil spring 6 mounted in the housing 3, is adapted to bear in order to normally hold the hook 4 in a predetermined position. The hook 4 may be readily connected with the trace or trace chain at one side of the collar to which the hame is applied and it will be obvious that by reason of the spring coöperating with the said hook, an elastic connection is established between the collar and the load which is connected up with the draft animal. Thus when the draft is initially placed upon the load it will be apparent that the elastic connections established by providing the hooks 4 mounted in the manner above indicated and connected with the hames, will give sufficiently to gradually place the strain upon the draft animal or animals instead of suddenly. The elasticity of the connection between the hames and the traces is advantageous throughout the period of application of the draft for reasons which will be obvious. In addition to the housing 3 in the plate 2, said plate may have an edge portion thereof rolled or otherwise formed to provide another housing 7 in which is arranged a spring similar to the spring 6 and connected with a rod 8 at one end of which is formed an eye 9 which receives a hame ring 10. The hame ring 10 is adapted to be connected with the breastplate or chain in the customary way and the parts 7, 8, 9 and 10 are advantageously utilized as they afford a connection between the breastplate or chain and the hames, similar to the connection between the traces and the hames and offering all the advantages of the last mentioned arrangement and construction of parts.

Of course the housings 3 and 7 may be formed in any suitable way but they are preferably made integral with the plate 2 to simplify the construction and cheapen the same from the standpoint of actual manufacture.

In the construction of the housing 3 it is preferred that the latter be formed with a longitudinal slot $3^a$ through which passes a portion of a plate or rod $3^b$, an end of which is adapted to coöperate with the hook 4 as a housing for the same. The member $3^b$ limits to a certain extent the movement of the hook 4 and at the same time has its auxiliary function of coöperating with said hook in the manner specified.

Attention is called to the fact that in the practical use of the invention, when it is applied to light construction of vehicle hames, it is contemplated to attach the same to a buckle or similar part, instead of to the trace hook. This may be carried out in various ways and is more practical under actual conditions of service.

By reference to Fig. 4 of the drawing it will be noted that a trace buckle 15 is substituted for the trace hook 4 illustrated in the other figures. Under certain conditions it is desirable that a trace be used in connection with the hame and said trace would be attached to the buckle 15 in a manner similar to the attachment of the trace chain to the trace hook 4. The advantages incident to the use of the trace hook 4 and its mounting would also be incident to the construction in Fig. 4.

Having thus described the invention, what is claimed as new is:

1. In a device of the character described, the combination of a housing, a hook having the shank thereof slidably mounted within the housing, and a rod carried by the shank of the hook and extending along the exterior of the housing, said rod normally closing the mouth of the hook.

2. In a device of the character described, the combination of a housing having a slot formed therein, a hook having the shank thereof slidably mounted within the housing, and a rod carried by the hook and extending along the exterior of the housing, one end of the rod operating within the slot in the housing and serving to limit the movement of the hook while the opposite end normally closes the mouth of the hook.

In testimony whereof I affix my signature in presence of two witnesses.

JOHN H. B. BUTTS. [L. S.]

Witnesses:
  E. R. INGRAM,
  C. E. BETHEL.